H. W. FISHER.
METHOD OF MANUFACTURING ELECTRICAL CABLES.
APPLICATION FILED JUNE 28, 1917.

1,282,208.

Patented Oct. 22, 1918.

WITNESSES
J. Herbert Bradley.
Francis J. Tomasson.

INVENTOR
Henry W. Fisher.
by Christy & Christy
his attorneys.

UNITED STATES PATENT OFFICE.

HENRY W. FISHER, OF HUGUENOT PARK, NEW YORK, ASSIGNOR TO STANDARD UNDERGROUND CABLE COMPANY, OF PITTSBURGH, PENNSYLVANIA, A CORPORATION OF PENNSYLVANIA.

METHOD OF MANUFACTURING ELECTRICAL CABLES.

1,282,208.  Specification of Letters Patent.  Patented Oct. 22, 1918.

Application filed June 28, 1917.   Serial No. 177,607.

*To all whom it may concern:*

Be it known that I, HENRY W. FISHER, residing at Huguenot Park, Staten Island, and State of New York, a citizen of the United States, have invented or discovered certain new and useful Improvements in Methods of Manufacturing Electrical Cables, of which improvements the following is a specification.

My invention relates to the manufacture of electric cables, and particularly to cables in which the insulation consists of a body of porous (ordinarily fibrous) material, filled with a viscid substance. The ideal filling substance, so far as concerns mechanical requirements, would be one which should remain viscid throughout all the range of temperature variation incident to service; it should neither become hard and break to pieces in very cold weather, nor become fluid and run out of the porous body in very warm weather; and yet, to meet manufacturing requirements, it should be a substance which, at reasonable elevation above atmospheric temperature, will become sufficiently fluid to enter into and saturate the porous body. Turning from mechanical to electrical requirements, it is found that, among the materials generally suitable as filling material, certain relatively fluid ones are of such excellent dielectric properties as to render them peculiarly suitable for cables intended for high voltage service.

It has heretofore been proposed to inclose in an impervious integument such a body of insulation as I have described above, and by such means to prevent the flowing away of the relatively fluid filling material; but the difficulty has been to apply the envelop so closely as to be effective, without in so doing allowing some of the filling material to flow away.

The object of my invention is to provide a method of manufacturing cables whereby an insulating compound having the desired physical and dielectric properties may be effectively incorporated in the insulating material entering into the cable structure.

Figure 1:
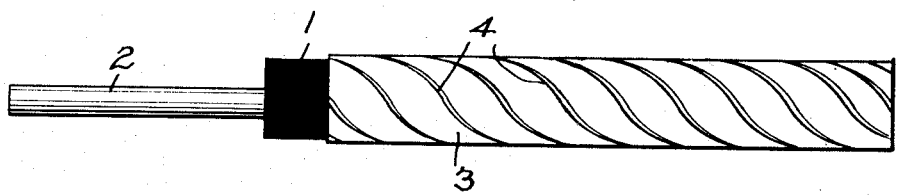
Figure 2:
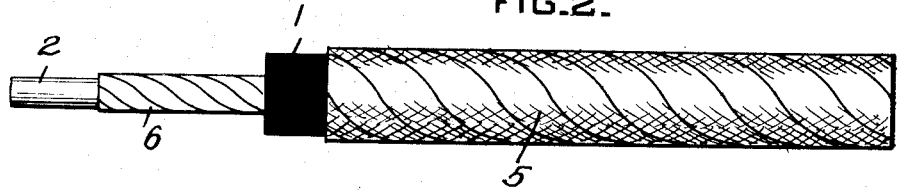

In the accompanying sheet of drawings there are shown several cables which may be manufactured according to my improved method. It will be understood, however, that such cables are shown for the purpose of illustrating rather than limiting my invention. Figures 1 and 2 are side views of single conductor cables, the several parts entering into their structures being shown stripped back variable distances from one end of the cable, and Fig. 3 a side view of a multiple conductor cable.

My fundamental improvement in method is to change the order of the steps of procedure; instead of filling the porous body with insulating compound and then applying the envelop, I apply the envelop to the porous body and then fill the porous body with the insulating compound.

Considering first the case of a single insulated conductor as shown in Fig. 1, ordinarily, but not necessarily the porous body 1 will be a body of paper wrapped on the conductor 2. Upon this paper body a strip of some impervious material 3 (such, for example, as varnished cloth) may be wrapped helically, with minute spaces 4 left between the edges of successive turns. The cable so built up may then be immersed in the insulating compound and raised to such a temperature that the compound in fluid condition will enter the small openings in the envelop and soak into and fill the paper beneath. The bath of insulating compound with the cable still submerged in it will then be cooled to a temperature approximating atmospheric temperature, in which cooling the insulating compound will have so far lost fluidity and gained viscosity as to flow out very little or not at all through the narrow openings between the turns of the wrapper. The cable or cable part may then safely be removed from the bath of compound and sheathed in lead, or otherwise additionally prepared for service.

Instead of the envelop of imperfect or limited perviousness which I have described, I prefer to employ an envelop of peculiar properties, now first made available in this connection. A strip of paper (or of cloth) filled with varnish and dried becomes impervious to insulating compounds, whatever the degree of their fluidity; the same strip of paper (or of cloth) if filled with benzene and dried remains substantially as porous after treatment as it was before. I take paper (or cloth) in strip form and fill it with varnish diluted with benzene (or its equivalent), the degree of dilution being suited to the end in view. When the paper (or cloth) so filled has been dried, it will be found to be impervious to insulating compounds in relatively viscid condition and pervious to those in relatively fluid condition. By varying the proportions of the mix, the degree of permeability may be adjusted, so as to meet actual conditions.

Proceeding then in my manufacture, having reference now to Fig. 2, I envelop the paper-wrapped and still unfilled cable part in a close and even wrapping of my specially prepared paper or cloth 5, having the characteristics described. I immerse the cable part so made ready in the insulating compound desired to be used, to the fluidity of which at atmospheric temperature the impermeability of the envelop has been carefully adjusted. I then heat the bath to such degree that the compound, rendered more fluid by heat, will penetrate the envelop and fill the underlying paper. I then allow the bath to cool to a point below the critical point in the matter of permeability of envelop, and I then safely remove the cable part from the bath, and proceed with such further manufacture as may be desired.

It is well known that cables are liable to leakage of the insulating compound, not from the outer surface of the insulation only, but from the ends and immediately around the centrally lying conductor as well; the compound soaks inward and creeps along the surface of the metal conductor, and between that surface and the over-lying body of porous material. Accordingly, I find it advantageous to initially wrap the bare conductor with two or three wrappings 6 of my paper, specially prepared after the manner above indicated (or I may wrap the conductor with a totally impervious wrapping, as of varnished cloth, for instance); next, to apply the porous insulating material 1, ordinarily wrapped-on paper; then to apply the outer envelop of the specially prepared paper 5; and, finally, to proceed with impregnation with insulating compound, as described above.

A cable made by the above plan might perhaps be advantageously saturated in two operations. The conductor would be covered with part of the paper insulation, then inclosed in the envelop of my invention, then saturated, cooled, and removed from the bath. The rest of the paper would then be applied, and another envelop of my invention; the so-far completed core would then be saturated again, removed from the compound at a sufficiently low temperature for the compound to run out; and the core would then be lead covered.

The invention is not limited in its applicability to the insulation surrounding a single conductor; the belt insulation for instance, which surrounds the assembled and separately insulated conductors of a multiple-conductor cable, may be limited inwardly with an envelop either altogether impervious or pervious to the degree fully indicated above, and it may be limited outwardly with an envelop of the limited and conditional permeability I have indicated, and when so built up may be soaked full of insulating compound after the manner indicated above. To make this plan effective, the strip of varnish cloth or other material employed to form the limiting and confining barrier will advantageously be much narrower than usual, so that it would not buckle or leave spaces between successive turns, through which the compound could flow.

Figure 3:
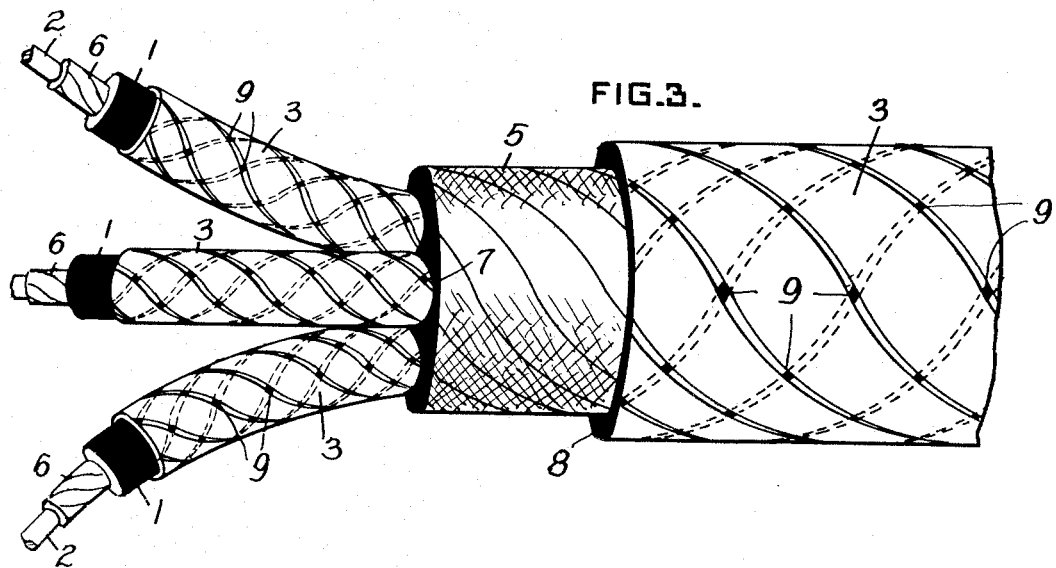

As illustrated in Fig. 3, it will be well, in multiple conductor cables, to surround the individual conductors 2 with fibrous insulation, employing my invention to the conductors individually, or not, as may be desired; then to assemble or "cable" the individual insulated conductors, using fillers 7, as is common; then to inclose the whole in the envelop 5 of limited permeability herein described, and saturate after the manner herein described whatever of contained porous insulation 8 remains unsaturated. Having proceeded so far, belt insulation may be applied as usual, and upon the belt insulation another envelop 3 of the limited permeability herein contemplated may be applied, and saturation of the belt insulation may then be effected, after the manner herein described.

When varnished cloth is used as the barrier against the passage of insulating compound, it may advantageously be applied in a plurality of wrapped-on layers, the wrapping of successive layers being in opposite directions, as shown in Fig. 3. The barrier can thus be rendered more effective and probably more uniform. In so applying varnished cloth narrower strips of cloth will be used, and accordingly there will be less liability of buckling of the wrapped-on layer of cloth. In the manufacture of large cables, the buckling effect of the cloth must be given careful consideration. The cloth must be uniformly applied, or else there may be a weak spot here and there along the length of the cable. For instance, if there were but one layer of cloth and the cloth should happen to break and unwind, there might be a space of a few inches where there would be no impervious barrier to retain the insulating compound within the insulation. Such a mischance would be less liable to happen should there be two layers of varnished cloth, particularly if they should be applied in oppositely directed windings. The cloth might be from one inch to one inch and a half in width, and the separation edges of successive turns of the wrapping of cloth might be separated a quarter of an inch (if penetration of the compound is so to be provided for); and, if two layers applied, should be wound in opposite directions, there would be left small holes 9 somewhat less than one quarter inch square, through which the compound could enter and saturate the cable. Of course the dimensions of these openings in the barrier may be varied, and should be varied to suit particular conditions. Of course, instead of providing spaces between adjacent turns of the wrappings, the specially prepared wrapping of limited and conditional permeability elsewhere described in this specification, may, if desired, be employed to accomplish the end in view.

Other extensions of the same informing principle will be made to suit particular conditions.

I have in the foregoing specification designated varnish as a suitable filler for paper, to render it substantially impervious to insulating compound at atmospheric temperature, and yet pervious to the same compound at elevated temperature. Manifestly varnish is here named in an exemplary way; the material used should be of a nature not easily affected by the insulating compound chosen, and otherwise possessing the properties indicated. Benzene too, mentioned as the diluent, is mentioned in an exemplary way; any other diluent of like properties, relative to the end in view, may be employed.

In the manufacture of a cable of this description, it becomes possible to use a very fluid insulating compound; and, as has been intimated, in this class of compounds are found certain ones which have very good dielectric properties. The compound best suited in physical properties is one which is very fluid at saturating temperature, between 260° and 300° F., but which at a temperature of 150°–180° F. is so thick or viscid that it will not readily run through the barrier envelop described above.

I claim as my invention:

1. The method of manufacturing an insulated electrical conductor impregnated with an insulating compound which is fluid at temperatures above normal cable-working temperatures and viscid at or below normal cable-working temperatures, which consists in surrounding an electrical conductor with a body of porous material, inclosing said body within an envelop permeable to fluid insulating compound but substantially impermeable to viscid insulating compound, allowing insulating compound at elevated temperature and in fluid condition to penetrate said envelop and saturate the inclosed porous material, and cooling the insulated conductor so manufactured.

2. The method of manufacturing an insulating electrical conductor impregnated with an insulating compound which is fluid at temperatures above normal cable-working temperatures and viscid at or below normal cable-working temperatures, which consists in surrounding an electrical conductor with a body of porous material, inclosing said body within an envelop of treated paper permeable to fluid insulating compound but substantially impermeable to viscid insulating compound, allowing insulating compound at elevated temperature and in fluid condition to penetrate said envelop and saturate the inclosed porous material, and cooling the insulated conductor so manufactured.

3. The method herein described of manufacturing an insulated electrical conductor, which consists in preparing a strip of paper by impregnating it with varnish diluted with benzene and allowing it to dry, enveloping a conductor covered with a body of porous material in a wrapping of paper so prepared, allowing insulated compound at elevated temperature to penetrate said envelop and saturate the porous material beneath, and cooling the article.

4. The method of insulating an electrical conductor, which consists in wrapping the conductor with a wrapper impervious to insulating compound which is substantially viscid at or below normal cable-working temperatures, surrounding the wrapped conductor with a body of porous material, inclosing the article so far assembled in an envelop permeable to fluid insulating compound but substantially impervious to viscid insulating compound, allowing insulating compound which is fluid at a temperature above but viscid at or below normal cable-working temperature to penetrate, when in a heated fluid state, said envelop and saturate the inclosed porous material, and cooling the article so assembled to a temperature below the normal cable-working temperature.

5. The method of insulating a multiple conductor cable, which consists in surrounding the conductors with bodies of porous insulation, assembling the so insulated conductors, inclosing the assembled conductors in an envelop permeable to fluid insulating compound but substantially impervious to viscid insulating compound, allowing insulating compound which is fluid at temperatures above but viscid at or below normal cable-working temperature to penetrate when in a heated fluid state, said envelop and saturate the enveloping porous insulation, surrounding the so-far completed cable with a body of porous material, inclosing the article in a second envelop of the aforesaid permeability, and allowing insulating compound of the aforesaid character, and when in a heated fluid state, to penetrate said second envelop and saturate the underlying porous material.

In testimony whereof I have hereunto set my hand.

HENRY W. FISHER.

Witnesses:
E. J. WARING,
R. W. ATKINSON.